Patented May 11, 1937

2,079,797

UNITED STATES PATENT OFFICE 2,079,797

PROCESS OF PRODUCING PROTEIN-IODINE COMPOUNDS

William P. Fitzgerald, Easton, Pa., assignor to J. T. Baker Chemical Company, Phillipsburg, N. J., a corporation of New Jersey No Drawing. Application November 29, 1933, Serial No. 700,357

2 Claims. (Cl. 167—53)

This invention relates to a process of producing such compounds.

The advantages of supplying a small amount of suitable organic compound of iodine to the feed for animals are well known and attempts have been made to prepare an organic compound comprising protein and iodine to be added to cattle feed. Such prior products, however, have been made by processes which are relatively costly and in many cases do not produce compounds of iodine and natural protein because the proteins are already hydrolyzed in the material used, or, of necessity are hydrolyzed in the process used to bring about the chemical combination with iodine.

One object of the invention is to provide a compound of iodine and natural proteins, that is to say, proteins which have not been hydrolyzed or otherwise changed by the process of manufacture other than to combine the iodine with the protein in an additive way. Such a compound is particularly suitable for administration internally to live stock to generally improve the condition of such live stock.

A further object of the invention is to provide a simple, efficient and economical process for the production of protein-iodine compounds while avoiding hydrolytic decomposition or change of the natural proteins other than by the addition of iodine, this process also being highly advantageous even for the treatment of proteins that are already hydrolyzed, on account of its simplicity and economy.

With the above objects in view, the process comprises the treatment of material whose protein content is relatively high, and still in its natural unhydrolyzed condition, by grinding it with solid iodine in a closed chamber for such a length of time that the solid iodine, as it is comminuted and its surface area increased, will volatilize directly into the protein-carrying material and effectively combine chemically with the protein.

The invention will now be described more specifically in connection with the following examples:

To prepare a compound which may be mixed with cattle-feed to serve as a so-called condition powder or gland stimulant, the starting material may be a feed material high in protein, such as ground alfalfa hay, ground sweet clover or other clover hay, linseed meal, soy bean meal, or cotton seed meal. It is important that this material shall not have been subjected to hydrolytic action, or at least not to any appreciable extent.

The protein-carrying starting material, for example, air-dried ground alfalfa, is put into a chamber, as, for example, the casing of a ball-mill using porcelain or flint balls or pebbles as the grinding means. Solid iodine is then added to the alfalfa in the desired proportion, as more fully explained hereinafter. The ball-mill is then closed and put in operation. By sufficiently long-continued grinding action, for example, two to three hours, the solid iodine is comminuted so finely that the increase in surface area will result in the complete vaporization of the iodine and its direct contact and combination with the protein of the alfalfa or other protein-carrying material which is being used. Of course, owing to the intimate mixture of the protein-carrying material and the finely comminuted iodine, the vapor of the iodine as it leaves the solid particles immediately and directly comes into contact with the protein. When the grinding step has been carried to the stage where no iodine is left in solid form, there may be some still in vapor form in the interstices of the protein-carrying material and in the atmosphere in the chamber of the ball-mill. Therefore, the grinding action is continued long enough to insure that substantially all the iodine is taken up. In order to avoid any appreciable loss of iodine it is well to have the protein in excess.

It is obvious that the solid iodine can be mixed with protein-carrying material in widely varying proportions because even a trace of iodine in the final product is a benefit but obviously it is uneconomical to use an amount greater than that necessary to combine with all the combinable protein. Usually 25% of solid iodine is the limit in practice and as low as 1/10% may be used with good effect, although in this case the resultant product must be added to the cattle-feed in relatively larger quantities than is the case when using a higher percentage of iodine. For convenience and economy in handling and transportation it is advantageous to make the product with a relatively high iodine content and then mix only a small amount, for example, a teaspoonful, with the usual amount of feed for one animal. Therefore, in the commercial production it is best to mix the protein-carrying starting material, for example, the ground alfalfa hay, with about 10% by weight of solid iodine. It is not necessary to use the chemically pure solid iodine, because there are cheaper commercial forms in which the impurities, not only are not disadvantageous, but on the contrary are beneficial. Generally the impurities in the crude iodine are chiefly sodium and iron salts and these are present in such small proportions as to be a benefit and not an injury to the cattle.

The grinding action is carried on until all of the material is ground to a very fine powder. It is well to employ a ball-mill which has no material in contact with the iodine which will be affected by it. For this reason, it is well to employ a porcelain or porcelain-lined mill using either porcelain or flint balls.

The products resulting from the above-described process are different from those made by adding aqueous solutions of iodine compounds to the protein-carrying materials, because the aqueous solutions bring about hydrolyzation of the proteins with a consequent change in the final products. The difference is more particularly noticeable in the odor of the finished products. By the process of this invention the products have different aromas according to the nature of the protein-carrying material used as a starting material, but in no case is the odor offensive to livestock. Where air-dried and ground sweet clover is used as the starting material the resulting product has the aroma of new mown hay and seems to be particularly attractive to cattle. It is possible that some slight chemical action is brought about by the iodine on some particular ingredient of the sweet clover other than the expected protein-iodine reaction, whereby the volatile material giving the aroma of new-mown hay is either released or synthesized. It will be found that the iodine is so well combined with the proteins of the protein-carrying material that an aqueous extract made from the final product will not give the usual starch-iodine reaction when tested with starch, or at most will give it only to a very slight extent.

While the best product is made from sweet clover, on account of the aroma which makes it so appetizing to cattle, the other products are very satisfactory. For example, products made from other clovers, alfalfa, the various oil-cakes, such as linseed, cottonseed and soy bean meals and bran are well liked. All of these protein-rich plant materials when in the normal air-dry condition have the advantage that their proteins have not been hydrolyzed or not to any great extent and always carry a large proportion of readily assimilable non-hydrolyzed proteins.

The process, of course, can be applied to other protein-carrying materials than those named, such, for example, as spent brewers grains, dry milk powder, dry buttermilk powder and the like, and much economy in production will thereby result. The products, however, will be different from those described hereinbefore, because the proteins have already been broken up by hydrolysis. As the protein content of the various materials used vary considerably in practice, the protein-containing starting materials may be analyzed to determine the protein-content, and the iodine then may be supplied in the proper proportion to unite with the desired proportion of the total protein content. This, however, is an unnecessary refinement, if good merchantable feed products, such as named hereinbefore, are selected as the protein-carrying material, as can be done by the usual inspection methods, since such feed products will contain sufficient proteins for the purposes of this invention, and more than enough to form a final product high in iodine when using the higher proportions hereinbefore stated. With such a product about one teaspoonful is added to and mixed with the usual amount of ground dry feed given to a cow at one feeding, the amount for other live stock being proportional to the weight of the animal.

What is claimed is:

1. The process of producing protein-iodine compounds which consists in bringing together an air-dry material carrying protein, and solid iodine, and grinding the two ingredients together in a closed chamber until the iodine has combined chemically with the protein.

2. The process of producing stock-feed powder high in assimilable iodine, which consists in adding solid iodine to comminuted air-dry stock-feed material carrying protein, and grinding the two ingredients together dry in a closed chamber for two to three hours.

WILLIAM P. FITZGERALD.